United States Patent
Lee et al.

(10) Patent No.: US 8,837,932 B2
(45) Date of Patent: Sep. 16, 2014

(54) CAMERA AND AUTO-FOCUSING METHOD OF THE CAMERA

(71) Applicant: Hon Hai Precision Industry Co., Ltd., New Taipei (TW)

(72) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/900,607

(22) Filed: May 23, 2013

(65) Prior Publication Data

US 2013/0322863 A1 Dec. 5, 2013

(30) Foreign Application Priority Data

Jun. 1, 2012 (TW) .............................. 101119719 A

(51) Int. Cl.
*G03B 3/00* (2006.01)
*G03B 13/20* (2006.01)

(52) U.S. Cl.
CPC ..................................... *G03B 13/20* (2013.01)
USPC ......................................................... 396/125

(58) Field of Classification Search
CPC ................................................ H04N 13/0203
USPC ......................................................... 396/125
See application file for complete search history.

(56) References Cited

U.S. PATENT DOCUMENTS

| | | | |
|---|---|---|---|
| 8,396,252 B2 * | 3/2013 | El Dokor | 382/106 |
| 8,564,693 B2 * | 10/2013 | Makii | 348/239 |
| 8,599,243 B2 * | 12/2013 | Okada et al. | 348/46 |
| 2008/0043218 A1 * | 2/2008 | Murayama | 356/5.04 |
| 2011/0007135 A1 * | 1/2011 | Okada et al. | 348/46 |
| 2011/0128365 A1 * | 6/2011 | Ren et al. | 348/78 |
| 2011/0134220 A1 * | 6/2011 | Barbour et al. | 348/44 |
| 2012/0098935 A1 * | 4/2012 | Schmidt et al. | 348/46 |
| 2012/0120277 A1 | 5/2012 | Tsai | |
| 2012/0154537 A1 * | 6/2012 | Chang et al. | 348/46 |
| 2012/0176476 A1 * | 7/2012 | Schmidt et al. | 348/46 |
| 2012/0249740 A1 * | 10/2012 | Lee et al. | 348/46 |
| 2012/0314039 A1 * | 12/2012 | You et al. | 348/49 |
| 2013/0033582 A1 * | 2/2013 | Sun et al. | 348/47 |
| 2013/0147977 A1 * | 6/2013 | Ren et al. | 348/208.6 |
| 2013/0156296 A1 * | 6/2013 | El Dokor | 382/154 |
| 2013/0201288 A1 * | 8/2013 | Billerbeck et al. | 348/46 |
| 2013/0222369 A1 * | 8/2013 | Huston et al. | 345/419 |
| 2013/0242058 A1 * | 9/2013 | Bae et al. | 348/47 |
| 2013/0286047 A1 * | 10/2013 | Katano et al. | 345/633 |

FOREIGN PATENT DOCUMENTS

TW 201203089 A 1/2012

* cited by examiner

*Primary Examiner* — Rodney Fuller
(74) *Attorney, Agent, or Firm* — Novak Druce Connolly Bove + Quigg LLP

(57) ABSTRACT

A camera includes a depth-sensing lens, an auto-focusing apparatus, and a display screen. In an auto-focusing method of the camera, a focusing position of the depth-sensing lens is determined when an image of the scene is shown on the display screen. The depth-sensing lens senses a depth between the object and the camera, and determines a distance between the object and the focusing position of the depth-sensing lens. An optimal focus of the camera is calculated according to the depth and the distance. The auto-focusing apparatus controls the depth-sensing lens to move from the focusing position to the optimal focus of the camera. The camera controls the depth-sensing lens to capture an image of the scene based on the optimal focus when a user presses a button of the camera.

18 Claims, 6 Drawing Sheets

Selecting an object from the scene shown on the display screen

Sensing a depth between the object and the depth-sensing lens

Capturing images of the scene using the depth-sensing lens

US 8,837,932 B2

CAMERA AND AUTO-FOCUSING METHOD OF THE CAMERA

BACKGROUND

1. Technical Field

Embodiments of the present disclosure relate to cameras and methods for adjusting focus of the cameras, and particularly to a camera and an auto-focusing method of the camera.

2. Description of Related Art

It is known in the art, that many camera employs a focusing system which automatically focuses the camera. While current cameras are designed with automatic focusing systems, a user must try to set up the camera within an allowable distance range of the focusing system included in the camera. Also, the user must employ his/her own visual feedback on different images of a scene in order to achieve an optimal image of the scene. These automatic focusing systems have been met with a modicum of success, but still they do not provide feedback to the user to allow the user to properly focus the camera automatically. Therefore, there is room for improvement within the prior art.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage system. Some non-limiting examples of a non-transitory computer-readable medium include CDs, DVDs, flash memory, and hard disk drives.

Figure 1:
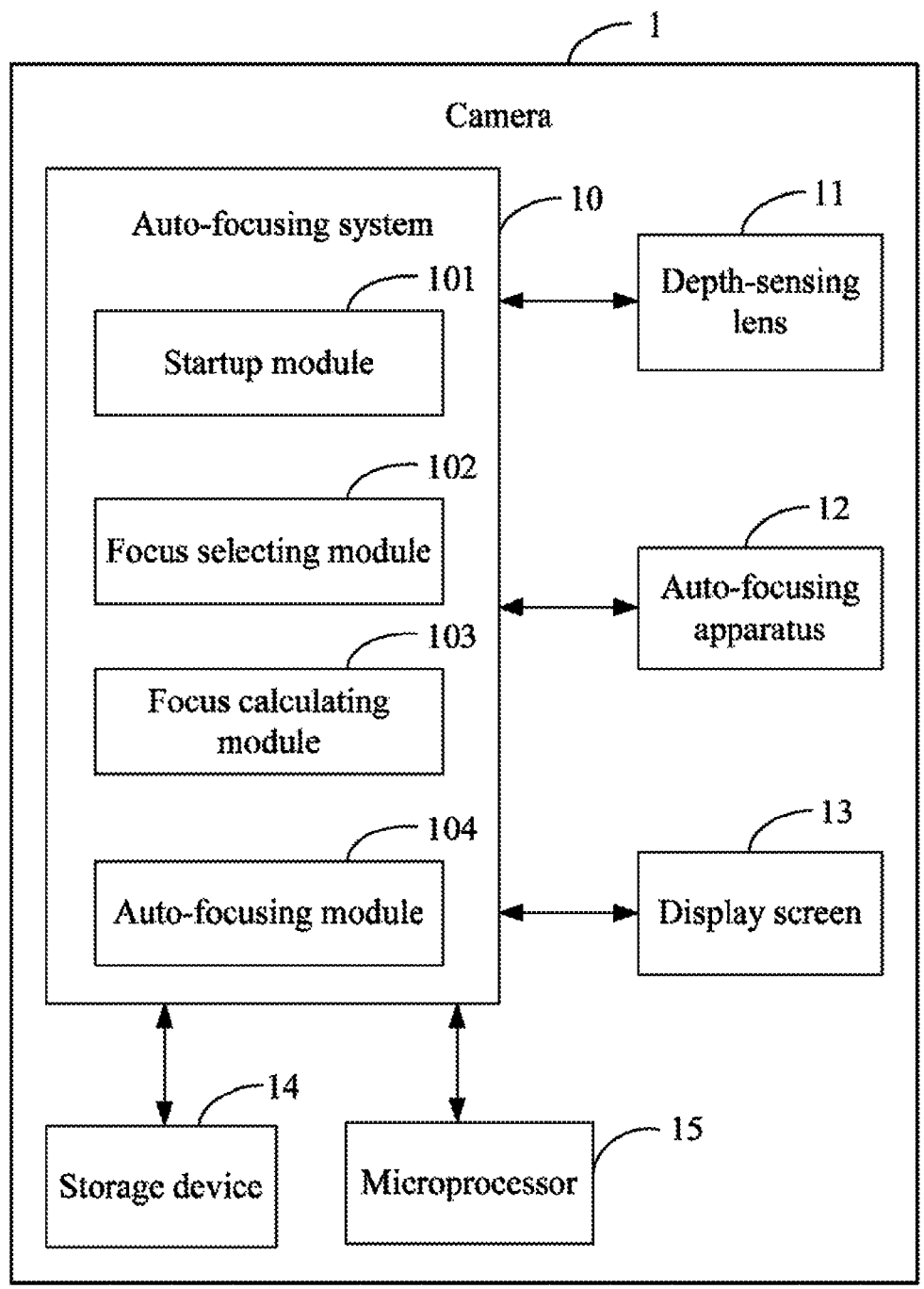
FIG. 1 is a block diagram of one embodiment of a camera including an auto-focusing system.

FIG. 1 is a block diagram of one embodiment of a camera 1 including an auto-focusing system 10. In the embodiment, the camera 1 further includes a depth-sensing lens 11, an auto-focusing apparatus 12, a display screen 13, a storage device 14, and at least one microprocessor 15. The auto-focusing system 10 may include computerized instructions in the form of one or more programs that are stored in the storage device 14 and executed by the at least one microprocessor 15. In one embodiment, the camera 1 may be a digital camera, a video camera, or any other image capturing device. FIG. 1 illustrates only one example of the camera 1, other examples may include more or fewer components than illustrated, or have a different configuration of the various components.

Figure 4:
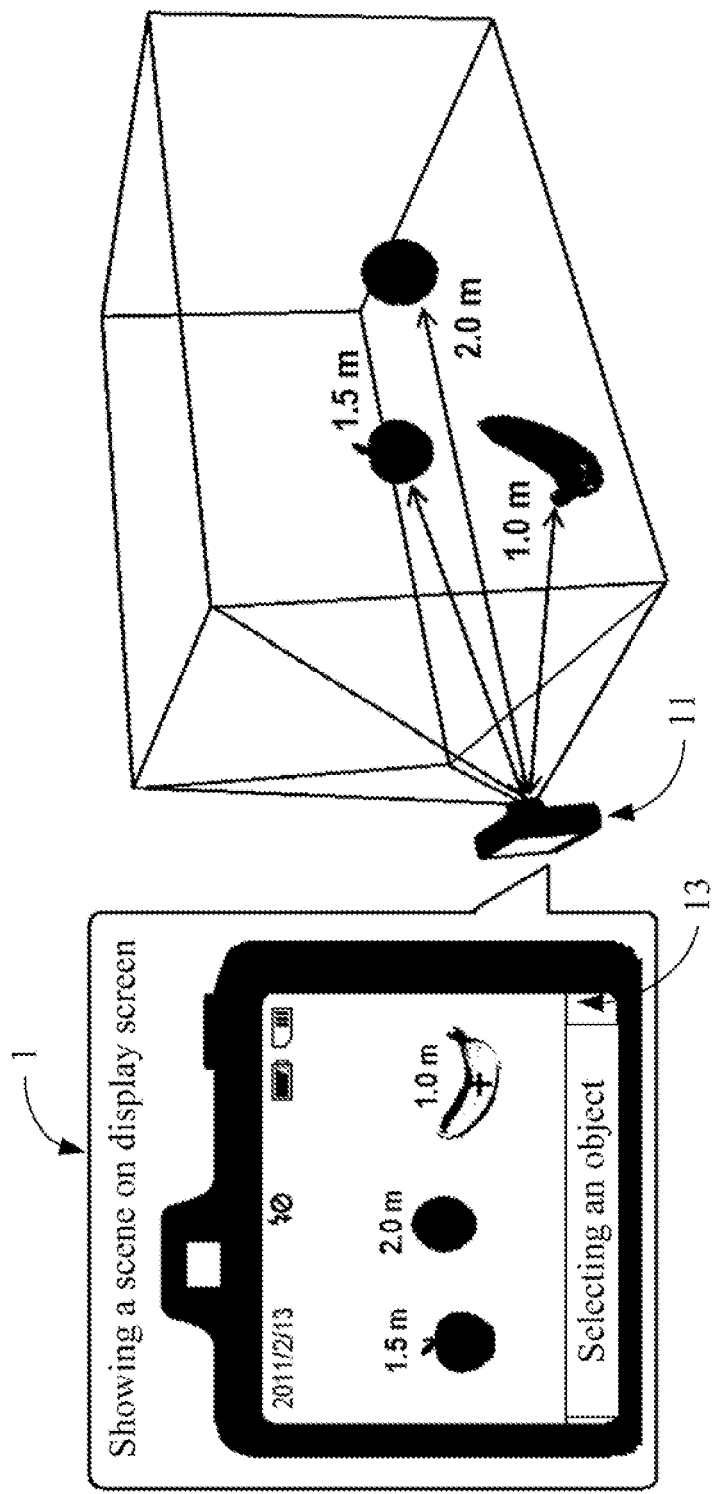
FIG. 4 shows one embodiment of a scene including one or more fruits such as apples, oranges or bananas.

The depth-sensing lens 11 is a time of flight (TOF) camera lens having a 3D image capturing functionality for capturing stereoscopic images of a scene, and can sense a depth between an object of the scene and the camera 1. Referring to FIG. 4 The object of the scene may be one or more fruits, such as an apple, an orange or a banana, for example.

The auto-focusing apparatus 12 is a motor that drives the depth-sensing lens 11 to adjust a focusing position of the camera 1 to an optimal position for capturing an image of the scene. The display screen 13 is a light-emitting diode (LED) screen that may be touched with fingers or a stylus, and is used to display the captured image of the scene. In one embodiment, the storage device 14 may be an internal storage system, such as a SD card, a random access memory (RAM) for temporary storage of information, and/or a read only memory (ROM) for permanent storage of information. The microprocessor 15 may be micro controller unit or a chipset that performs various functions of the camera 1.

In one embodiment, the auto-focusing system 10 includes a startup module 101, a focus selecting module 102, a focus calculating module 103, and an auto-focusing module 104. The modules may comprise computerized instructions in the form of one or more programs that are stored in the storage device 14 and executed by the at least one microprocessor 15. A detailed description of each module will be given in the following paragraphs.

Figure 2:
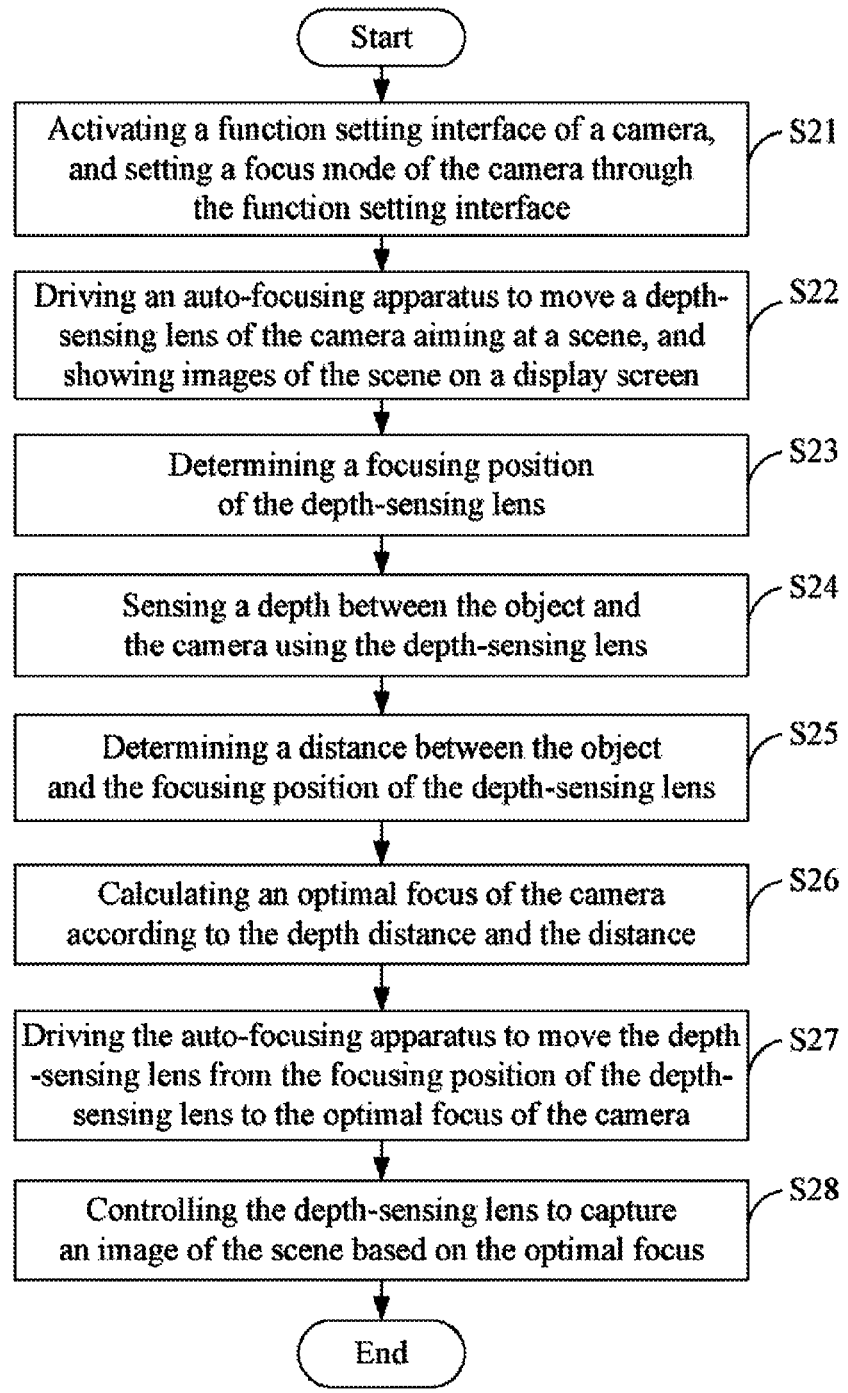
FIG. 2 is a flowchart of one embodiment of an auto-focusing method of the camera in FIG. 1.

FIG. 2 is a flowchart of one embodiment of an auto-focusing method of the camera 1 in FIG. 1. The method is performed by execution of a computer-readable program code or instructions by the at least one microprocessor 15 of the camera 1. Depending on the embodiment, additional steps may be added, others removed, and the ordering of the steps may be changed.

Figure 3:
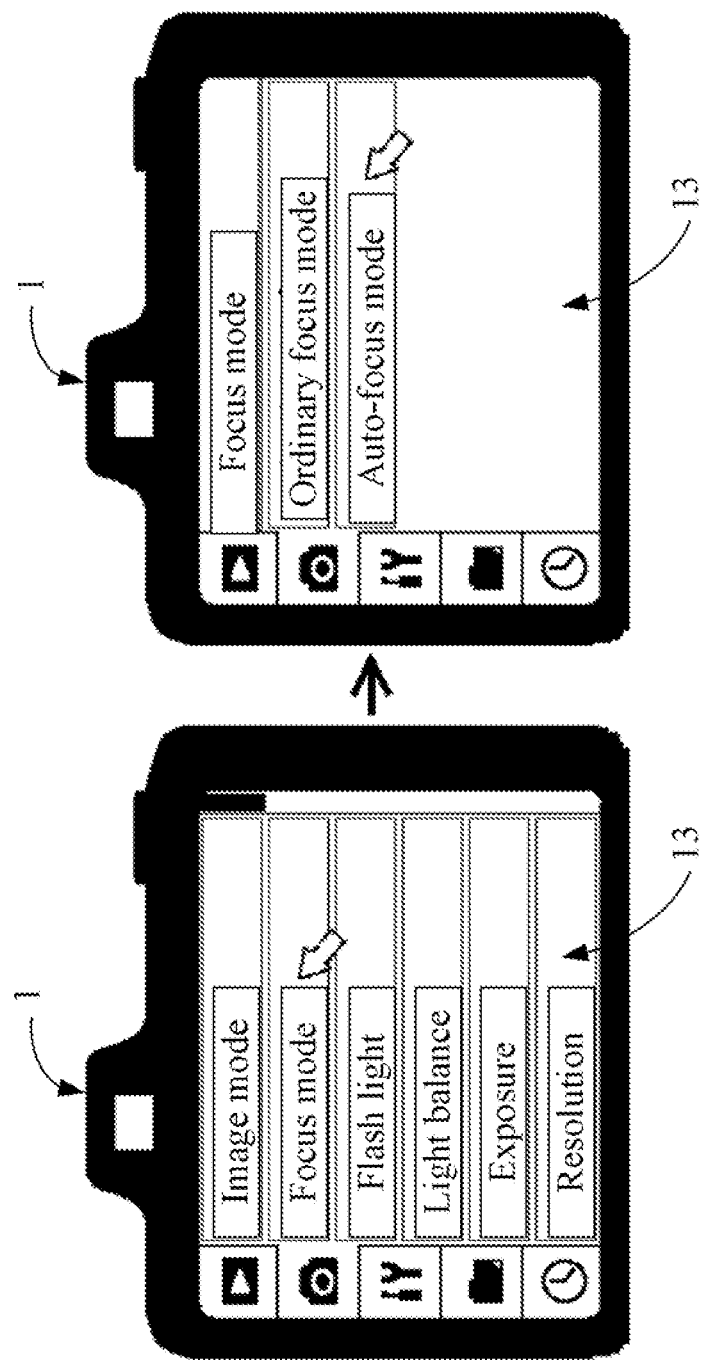
FIG. 3 shows one embodiment of a function setting interface of the camera.

In step S21, the startup module 101 activates a function setting interface of the camera 1, and sets a focus mode of the camera 1 through the function setting interface. FIG. 3 shows one embodiment of the function setting interface of the camera. In the embodiment, the function setting interface is displayed on the display screen 13 when the camera 1 is powered on. The function setting interface may include a plurality of icons for showing different modes, such as an image mode, a focus mode, a flash light mode, a light balance adjustment mode, an exposure mode and a resolution adjustment mode. The user can select one or more icons to set favorite functions of the camera 1 though the function setting interface. For example, if the user touches an icon of the focus mode on the display screen 13, an ordinary focus mode and an auto-focus mode are displayed on the function setting interface for the user to select the focus mode of the camera 1.

In step S22, the focus selecting module 102 drives the auto-focusing apparatus 12 to move the depth-sensing lens 11 of the camera 1 aiming at the scene, and shows images of the scene on the display screen 13 of the camera 1. FIG. 4 shows one embodiment of the scene including one or more fruits, such as an apple, an orange or a banana, for example. The focus selecting module 102 images the scene on the display screen 13 when the depth-sensing lens 11 of the camera 1 moves aiming at the scene.

Figure 5:
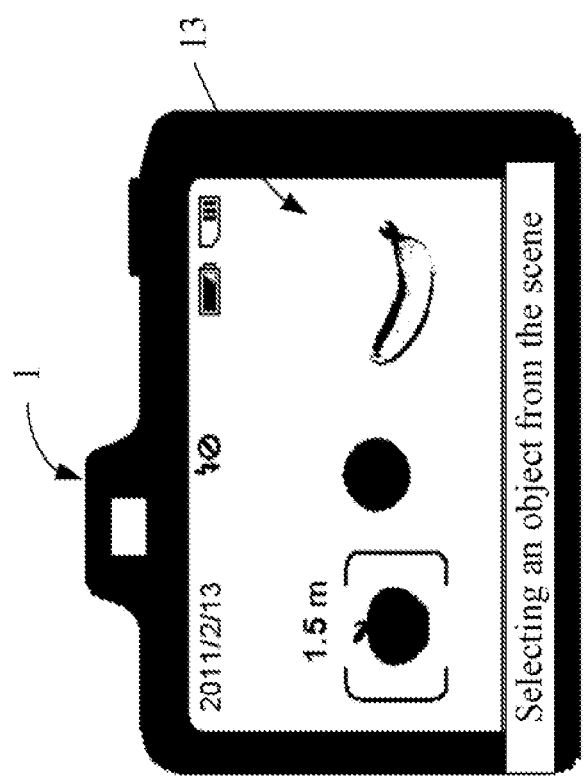
FIG. 5 shows one embodiment of selecting a object from the scene displayed on a display screen of the camera.

In step S23, the focus selecting module 102 determines a focusing position of the depth-sensing lens 11 when the user selects an object of the scene shown as an image on the display screen 13. FIG. 5 shows one embodiment of selecting an object from the image of the scene displayed on the display screen 13. In the example, the user can select one of the objects such as the apple from the scene displayed on the display screen 13, and determines the object of the scene as the focusing position of the depth-sensing lens 11.

In step S24, the focus selecting module 102 senses a depth between the object of the scene and the camera 1 using the depth-sensing lens 11. In one example with respect to FIG. 4, the depth between the apple in the scene and the camera 1 may be 1.5 meters, the depth between the orange in the scene and the camera 1 may be 2.0 meters, and the depth between the banana in the scene and the camera 1 may be 1.0 meters.

In step S25, the focus calculating module 103 determines a distance between the object of the scene and the focusing position of the depth-sensing lens 11. In one embodiment, the focus calculating module 103 can determine the distance according to the position of the object in the scene and the focusing position of the depth-sensing lens 11.

In step S26, the focus calculating module 103 calculates an optimal focus of the camera 1 according to the depth and the distance. The optimal focus of the camera 1 can make the camera 1 capture an image of the scene.

In step S27, the auto-focusing module 104 drives the auto-focusing apparatus 12 to move the depth-sensing lens 11 from the focusing position of the depth-sensing lens 11 to the optimal focus of the camera 1. In the embodiment, the auto-focusing apparatus 12 automatically adjusts the depth-sensing lens 11 to move from the focusing position of the depth-sensing lens 11 to the optimal focus of the camera 1.

In step S28, the auto-focusing module 104 controls the depth-sensing lens 11 to capture an image of the scene based on the optimal focus of the camera 1 when the user presses a button of the camera 1. The image of the scene is an optimal image of the scene, which may include all fruits such as the apple, the orange and the banana.

Figure 6:
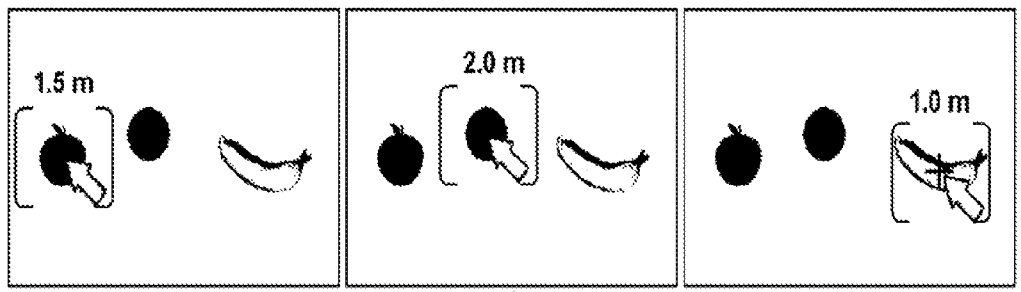
FIG. 6 shows one embodiment of images of the scene captured by the camera in different focusing positions.
Figure 6:
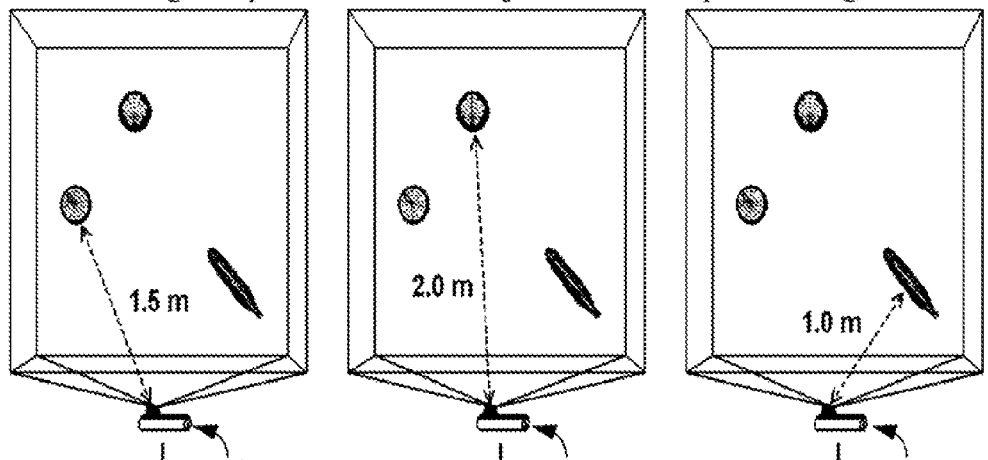
Figure 6:
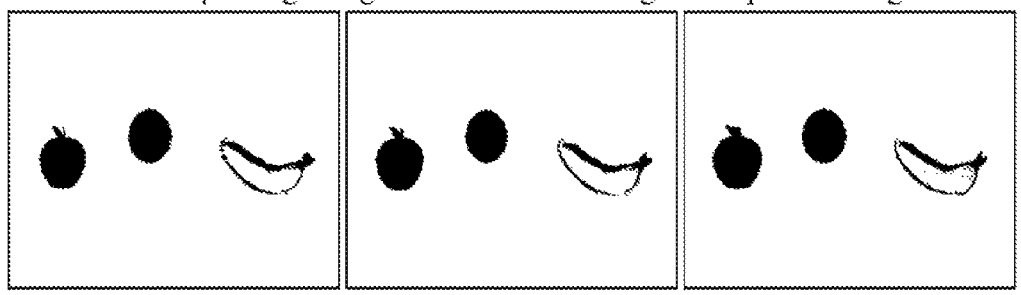

FIG. 6 shows one embodiment of images of the scene captured by the camera 1 in different focusing positions. In the example, the user can select different objects (i.e., the apple, the orange or the banana) from the scene as a focusing position of the depth-sensing lens 11, and the camera 1 may capture images of the scene in different focusing positions.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A camera, comprising:
   a depth-sensing lens, an auto-focusing apparatus, and a display screen;
   at least one microprocessor; and
   a storage device for storing one or more computer-readable programs, which when executed by the at least one microprocessor, cause the at least one microprocessor to:
   drive the auto-focusing apparatus to move the depth-sensing lens aiming at a scene, and show images of one or more objects in the scene on the display screen;
   determine a focusing position of the depth-sensing lens when an object is selected from the scene shown on the display screen;
   sense a depth between the object in the scene and the camera using the depth-sensing lens;
   determine a distance between the object in the scene and the focusing position of the depth-sensing lens;
   calculate an optimal focus of the camera according to the depth and the distance;
   drive the auto-focusing apparatus to move the depth-sensing lens from the focusing position of the depth-sensing lens to the optimal focus of the camera; and
   controlling the depth-sensing lens to capture an image of the scene based on the optimal focus of the camera when a button of the camera is pressed.

2. The camera according to claim 1, wherein the one or more computer-readable programs further cause the at least one microprocessor to activate a function setting interface of the camera when the camera is powered on, and set a focus mode of the camera through the function setting interface.

3. The camera according to claim 1, wherein the depth-sensing lens is a time of flight (TOF) camera lens having a 3D image capturing functionality for capturing stereoscopic images of the scene and sensing the depth between the object in the scene and the camera.

4. The camera according to claim 1, wherein the display screen is a light-emitting diode (LED) screen that is touchable with user's fingers or a stylus.

5. The camera according to claim 1, wherein the auto-focusing apparatus is a driving motor that drives the depth-sensing lens to automatically adjust the focusing position of the depth-sensing lens to the optimal focus of the camera.

6. The camera according to claim 1, wherein the function setting interface includes a plurality of icons for showing different modes that include a focus mode, an image mode, a flash light mode, a light balance adjustment mode, an exposure mode and a resolution adjustment mode.

7. An auto-focusing method of a camera, the camera comprising a depth-sensing lens, an auto-focusing apparatus and a display screen, the auto-focusing method comprising:
   driving the auto-focusing apparatus to move the depth-sensing lens aiming at a scene, and showing images of one or more objects in the scene on the display screen;
   determining a focusing position of the depth-sensing lens when an object is selected from the scene shown on the display screen;
   sensing a depth between the object in the scene and the camera using the depth-sensing lens;
   determining a distance between the object in the scene and the focusing position of the depth-sensing lens;
   calculating an optimal focus of the camera according to the depth and the distance;
   driving the auto-focusing apparatus to move the depth-sensing lens from the focusing position of the depth-sensing lens to the optimal focus of the camera; and
   controlling the depth-sensing lens to capture an image of the scene based on the optimal focus of the camera when a button of the camera is pressed.

8. The auto-focusing method according to claim 7, further comprising:
   activating a function setting interface of the camera when the camera is powered on; and
   setting a focus mode of the camera through the function setting interface.

9. The auto-focusing method according to claim 7, wherein the depth-sensing lens is a time of flight (TOF) camera lens having a 3D image capturing functionality for capturing stereoscopic images of the scene and sensing the depth between the object in the scene and the camera.

10. The auto-focusing method according to claim 7, wherein the display screen is a light-emitting diode (LED) screen that is touchable with user's fingers or a stylus.

11. The auto-focusing method according to claim 7, wherein the auto-focusing apparatus is a driving motor that drives the depth-sensing lens to automatically adjust the focusing position of the depth-sensing lens to the optimal focus of the camera.

12. The auto-focusing method according to claim 7, wherein the function setting interface includes a plurality of icons for showing different modes that include a focus mode, an image mode, a flash light mode, a light balance adjustment mode, an exposure mode and a resolution adjustment mode.

13. A non-transitory storage medium having stored thereon instructions that, when executed by at least one microprocessor of a camera, causes the camera to perform an auto-focusing method, the camera comprising a depth-sensing lens, an auto-focusing apparatus and a display screen, the auto-focusing method comprising:

driving the auto-focusing apparatus to move the depth-sensing lens aiming at a scene, and showing images of one or more objects in the scene on the display screen;

determining a focusing position of the depth-sensing lens when an object is selected from the scene shown on the display screen;

sensing a depth between the object in the scene and the camera using the depth-sensing lens;

determining a distance between the object in the scene and the focusing position of the depth-sensing lens;

calculating an optimal focus of the camera according to the depth and the distance;

driving the auto-focusing apparatus to move the depth-sensing lens from the focusing position of the depth-sensing lens to the optimal focus of the camera; and controlling the depth-sensing lens to capture an image of the scene based on the optimal focus of the camera when a button of the camera is pressed.

14. The storage medium according to claim 13, wherein the method further comprises:

activating a function setting interface of the camera when the camera is powered on; and setting a focus mode of the camera through the function setting interface.

15. The storage medium according to claim 13, wherein the depth-sensing lens is a time of flight (TOF) camera lens having a 3D image capturing functionality for capturing stereoscopic images of the scene and sensing the depth between the object in the scene and the camera.

16. The storage medium according to claim 13, wherein the display screen is a light-emitting diode (LED) screen that is touchable with user's fingers or a stylus.

17. The storage medium according to claim 13, wherein the auto-focusing apparatus is a driving motor that drives the depth-sensing lens to automatically adjust the focusing position of the depth-sensing lens to the optimal focus of the camera.

18. The storage medium according to claim 13, wherein the function setting interface includes a plurality of icons for showing different modes that include a focus mode, an image mode, a flash light mode, a light balance adjustment mode, an exposure mode and a resolution adjustment mode.

\* \* \* \* \*